Feb. 13, 1951     J. C. GORDON     2,541,868
EMBOSSED RUG CUSHION

Filed Oct. 22, 1948     2 Sheets-Sheet 1

INVENTOR.
JACK C. GORDON

BY Daniel G. Cullen

ATTORNEY

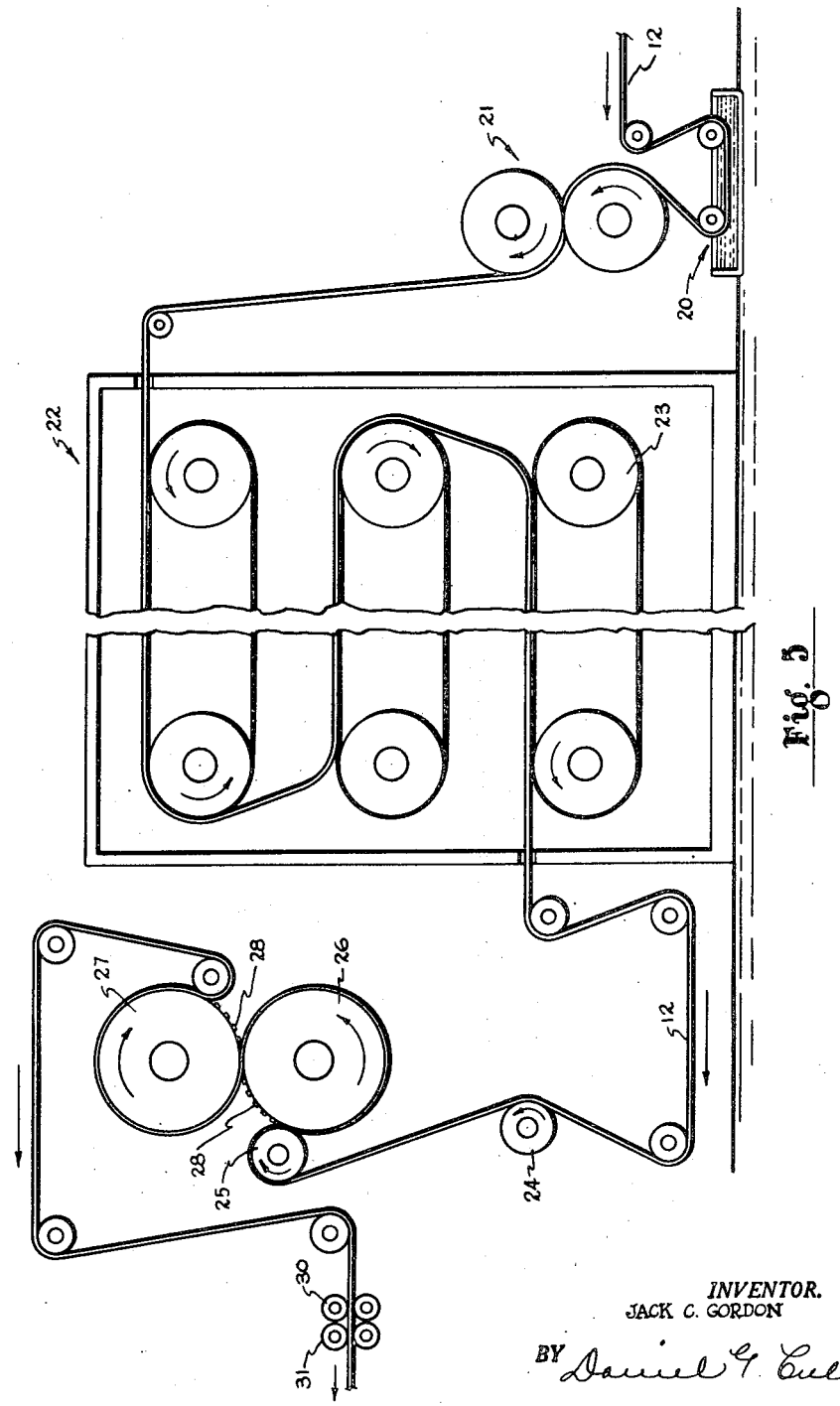

Patented Feb. 13, 1951

2,541,868

UNITED STATES PATENT OFFICE 2,541,868

EMBOSSED RUG CUSHION

Jack C. Gordon, Detroit, Mich., assignor to Allen Industries, Inc., Detroit, Mich.

Application October 22, 1948, Serial No. 56,039

5 Claims. (Cl. 41—24)

This application relates to embossed rug cushions, and particularly aims to provide embossed, rigid and nonstretchable rug cushions of felt, such as felted jute or hair, and having both surfaces coated with a cured sealing compound, and embossed in any suitable pattern.

The sealing compound may be rubber latex, either natural or synthetic, or any rubber dispersion, either natural or synthetic. One suitable compound is known as "Neoprene." This is a synthetic product made by Du Pont Company of Wilmington, Delaware, and described in Patent No. 2,402,837 of June 25, 1946. It is known as chloroprene and is identified by the formula chlore-2-butadiene-1,3. It is a rubber emulsion or dispersion compounded with typical accelerators, age retarders, vulcanizing agents and other basic ingredients, fillers, pigments and the like. While the exact composition of the neoprene which I have successfully used in making the rug cushion hereof is not known, it is not believed to be material. It is a typical neoprene composition and is obtained under identification of Neoprene 571. For the purposes of this application it may be considered that any suitable sealing compound of the rubber latex, or rubber dispersion class, of which neoprene is an example, may be utilized.

The present invention aims to provide a rug cushion or pad, both of whose surfaces are coated with an above mentioned sealing compound and embossed, and whose edges are beveled.

A further object of this invention is to provide a rug cushion which will possess little or no stretch as compared to the customary rug cushions well known in the art. This advantage is obtained by sealing the cushion on both its surfaces with an above mentioned sealing compound and thus securing the pad or cushion to a permanently sealed and definite dimension.

A further object of the invention is to provide a rug cushion which is readily manageable, easy to manufacture and which can be cut to accurate size, without making any additional allowances for future stretch, as is now customary in the rug cushion industry, thereby saving substantial savings in labor costs, equipment, time and materials necessary to produce these rug cushions.

A further object of the invention is to provide a rug cushion having on both surfaces cured coatings of an above mentioned sealing compound which are of a character that will not deteriorate or revert to a tacky or sticky stage.

A further object of the invention is to provide a rug cushion having sufficient rigidity to facilitate ease of handling between the seller and the user. The seller may with ease cut small pieces from large rolls and may lay the cushion to the floor without wrinkles or bumps. The rigid coated pad will afford a greater degree of ease in handling than the customary limp and uncoated pad.

A further object of the invention is to provide a rug cushion whose edges are beveled, trimmed and sealed, thus allowing the carpeting on the cushion to fall gradually to the floor and at the same time present a pleasing and improved appearance of the rug along the margin.

In order to afford an understanding of this invention, it will be described in connection with illustrative embodiments thereof shown in the accompanying drawings: further purposes, features and advantages of this invention will be apparent from the following description of this invention and of the embodiments thereof shown in the drawings, wherein Fig. 1 is a fragmentary plan view of a rug cushion.

Fig. 5 is a diagrammatic view of apparatus for forming the rug cushion.

Figure 1:
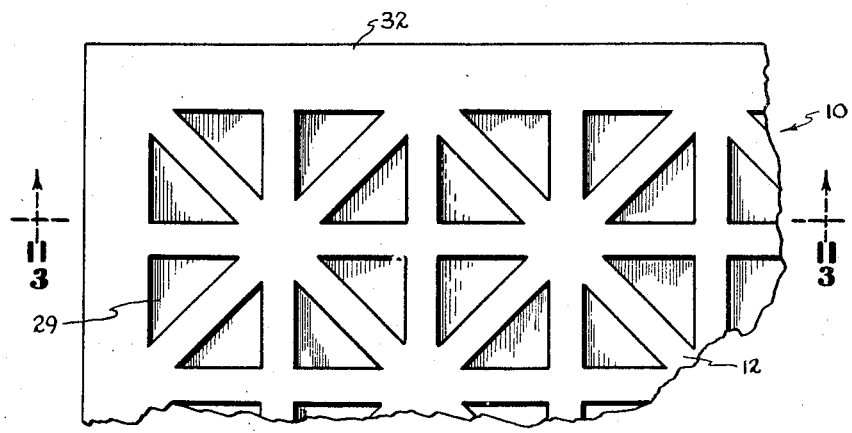
Figure 2:
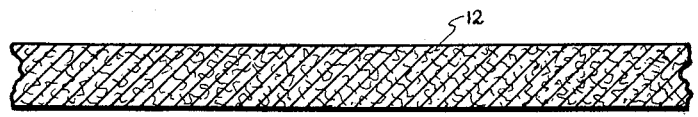
Fig. 2 is a vertical section of a felt sheet before being coated with an above mentioned sealing compound on its surfaces.
Figure 3:
Fig. 3 is a section view as if on line 3—3 of Fig. 1, showing the rug cushion after it is coated and with an edge shown as singly beveled.

One preferred embodiment of the invention is shown in Figs. 1-3. The cushion is indicated generally by reference numeral 10 and consists of a base sheet 12 made of felt. The felt will consist of jute or hair or a percentage of jute and hair fibers garnetted and needled to make a felt product of a given density. A form of reinforcement such as tobacco cloth or burlap, not shown, may be used in the center of the felt 12 if a stronger product is desired.

Both faces of the pad are coated, as will later be described, with cured sealing compound coatings 13 whose details and provision will later be described.

As the first step in the manufacture of the rug cushion, the felt base 12 is passed through a dye bath 20, Fig. 5, and then to surplus squeezing rollers 21 and a drying oven 21 containing drying rolls 23. There the felt base is dried and passed on to rolls 24—25 where the sealing or coating compound is applied to both surfaces.

The coating of the felt sheet 12 can be accomplished by various well known methods. It may be applied by roll coating, as shown, or it could be accomplished by spray coating, or a combination of the two methods could be used. In any event, after the felt sheet 12 has passed through the drying oven, its surfaces are coated with a coating compound.

From here the coated felt sheet is passed to curing and embossing compression rollers 26—27 in the form of hollow rollers having their outer surfaces provided with male protuberances 28 to form an indented pattern in the travelling coated felt sheet, the indentations being shown at 29. The rollers 26—27 are provided with internal electrical heating means, not shown, for curing the coatings on the sheet. The heating requirement of the rollers 26—27 may range between 180° F. to 450° F., depending upon which type of compound is used for coating the felt sheet. Air blown through the hollow rollers 26—27 will aid in the drying and curing of the coatings. Regardless of the form, apparatus should be used to effect complete curing of the coatings.

From here the coated sheet may be passed to two sets of rollers 30—31 which respectively bevel and trim the edges of the coated felt sheet as shown at 32 in Fig. 3.

Figure 4:
Fig. 4 is a view like Fig. 3 but showing the edge of the rug cushion doubly beveled.

The beveling may be of the form shown in Figs. 1-3, or of the form shown in Fig. 4; the former is better from the point of view of having the rug cushion lie flat, but the latter is better from the point of view of permitting the rug cushion to be reversible on the floor.

The sealing compound may be mixed with various types of anti-oxidants and curing ingredients and stabilizers to permit a perfect application and curing of the sealing compound with complete assurance that no oxidation or deterioration will take place after the sealing compound has been applied to the felt sheet and cured.

It will be observed that the center portion of the rug cushion is not at all penetrated by the coatings of sealing compound on the opposite surfaces of the rug cushion, nor is densified or cured by the compression rollers 26—27. The projections 28 of these rollers are so designed as merely to densify and cure the outer surfaces of the rug cushion, stiffening these surfaces, but leaving the center portion of the felt sheet comparatively unchanged, and hence, pliable in accordance with the characteristics of the felt sheet before coating.

While this invention has been described in connection with certain illustrative embodiments thereof, it is to be understood that this has been done merely for exemplification and that the scope of the invention is to be limited only by the following claims.

What I claim is:

1. A floor covering rug cushion underlay comprising a thick, loosely matted and felted fiber cushion base having a substantially spongy resilience by having a pattern embossed on at least one surface thereof, said pattern comprising a suitable configuration formed of a plurality of embossed indentations, each of said indentations being separated from each other by unindented ridges, both indented and raised ridge portions lying solely in a surface of the rug cushion, and cured as a continuous film of a resilient rubber composition having sufficient thickness to be self-identifiable as a coherent rubbery layer having integrally included therein the fibers lying on the surface only of said fiber base whereby said surface will retain its configuration having enhanced cushioning effect, said indented portions being press hardened and cured to a greater degree than said ridge portions and having thereby a lower degree of resiliency.

2. The rug cushion underlay as defined in claim 1 wherein the surface coating is neoprene latex.

3. The rug cushion underlay as defined in claim 1, wherein the ridges of the embossment are substantially narrow and surround indented portions of substantially larger surface area.

4. Rug cushion underlay as defined in claim 1, wherein the surface embossment extends over substantially the entire area of the surface of the rug.

5. Rug cushion underlay as defined in claim 1, wherein the rubber film is a heat cured film of rubber latex particles coated thereon.

JACK C. GORDON.

REFERENCES CITED

The following references are of record in the file of this patent:

UNITED STATES PATENTS

| Number | Name | Date |
| --- | --- | --- |
| 798,387 | Beale | Aug. 29, 1905 |
| 2,208,236 | Wiener | July 16, 1940 |
| 2,314,162 | Reinhardt | Mar. 16, 1943 |